United States Patent
Mei et al.

(10) Patent No.: US 6,816,907 B1
(45) Date of Patent: Nov. 9, 2004

(54) SYSTEM AND METHOD FOR PROVIDING DIFFERENTIATED SERVICES ON THE WEB

(75) Inventors: Gee-Gwo Mei, Yorktown Heights, NY (US); Kun-Lung Wu, Yorktown Heights, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 763 days.

(21) Appl. No.: 09/644,915

(22) Filed: Aug. 24, 2000

(51) Int. Cl.[7] .................. G06F 15/16; G06F 15/173

(52) U.S. Cl. ............................ 709/229; 709/225

(58) Field of Search ........................ 709/203, 217, 709/219, 229, 225; 370/395.21

(56) References Cited

U.S. PATENT DOCUMENTS

| | | | | |
|---|---|---|---|---|
| 4,104,718 A | * | 8/1978 | Poublan et al. ............... | 707/8 |
| 6,021,263 A | * | 2/2000 | Kujoory et al. ............. | 709/232 |
| 6,160,818 A | * | 12/2000 | Berger et al. .............. | 370/468 |
| 6,385,169 B1 | * | 5/2002 | Wang ........................ | 370/230 |
| 6,463,470 B1 | * | 10/2002 | Mohaban et al. ........... | 709/223 |
| 6,466,984 B1 | * | 10/2002 | Naveh et al. ............... | 709/228 |
| 6,553,413 B1 | * | 4/2003 | Leighton et al. ........... | 709/219 |
| 6,577,628 B1 | * | 6/2003 | Hejza ........................ | 370/392 |
| 6,587,433 B1 | * | 7/2003 | Borella et al. .............. | 370/230 |
| 6,657,960 B1 | * | 12/2003 | Jeffries et al. ............ | 370/230.1 |

FOREIGN PATENT DOCUMENTS

| | | | | |
|---|---|---|---|---|
| GB | 2361609 A | * | 10/2001 | ............ H04L/9/14 |
| JP | 2000312226 A | * | 11/2000 | .......... H04L/12/56 |
| WO | WO 200197470 A1 | * | 12/2001 | .......... H04L/12/56 |

OTHER PUBLICATIONS

X. Chen et al, "Providing differentiated service from an Internet server" In Proc. IEEE Intel Conf. on Computer Communications and Networks, Boston, MA, Oct. 1999.*

(List continued on next page.)

Primary Examiner—Marc D. Thompson
Assistant Examiner—Yemane M. Gerezgiher
(74) Attorney, Agent, or Firm—Ohlandt, Greeley, Ruggiero & Perle, L.L.P.; Louis J. Percello

(57) ABSTRACT

A data communications network includes network servers, clusters of network servers, as well as content providers and service providers, such as ISPs and ASPs, and further includes at least one data processor that operates under control of a stored program resident on a memory media. The stored program directs operation of the data processor to provide users with differentiated services by defining, for individual ones of the plurality of content providers, a plurality of levels of services for users, and for responding to service level tables received from individual ones of the plurality of content providers, where individual ones of users are assigned to one of the plurality of levels of service. There is also at least one resource requirement table for defining at least a minimum set of resources required for realizing individual ones of said plurality of service levels. The program further directs operation of the at least one data processor to merge the plurality of resource requirement tables into a merged resource requirement table for use by a particular one of the network servers. The particular one of the network servers assigns differentiated service levels to incoming user requests in accordance with the service level tables, and in accordance with the merged resource requirement tables and currently available resources. The resources can include one of numbers of available servers, available memory capacity, and available bandwidth. The program further controls operation of the at least one data processor to redirect an incoming user request to a network server having sufficient available resources to provide a specified level of service for the user request.

34 Claims, 5 Drawing Sheets

OTHER PUBLICATIONS

Wu–chang Feng et al, "Adaptive packet marking the providing differentiated services in the Internet", Network Protocols, 1998. Proceedings. Sixth International Conference on, Oct. 13–16, 1998, pp.:108–117.*

J. Almeida et al, "Providing differentiated levels of service in web content hosting", In Proc. First Workshop on Internet Server Performance, ACM SIGMETRICS 98, Jul. 1998.*

R. Pandey et al, "Supporting quality of service in HTTP servers", In Symposium on Principles of Distributed Computing, pp. 247–256, 1998.*

L. Eggert et al, "Application–Level Differentiated Services for Web Servers", World Wide Web Journal, vol. 2, No. 3, Mar. 1999, pp. 133–142.*

Gautam Rao, "Application Level Differentiated Services for Web Servers", retrieved from UNL (University of Nebraska–Lincoln), http://csce.unl.edu/~bhavanal/web/alumnidocs/grao.MS.pdf, Apr. 2000.*

Surendar Chandra et al, "Application level differentiated multimedia web services using quality aware transcoding", IEEE Special Issue on QOS in the Internet, 2000.*

* cited by examiner

| SERVICE LEVEL | SERVERS (min/max) | STORAGE (min/max) | BANDWIDTH (min/max) |
|---|---|---|---|
| GOLD | 50/130 | 40/80 | 50/100 |
| SILVER | 20/60 | 20/40 | 20/80 |
| BRONZE | | | |

| USER ID FROM COMPANY XYZ | SERVICE LEVEL |
|---|---|
| JOHN DOE | GOLD |
| MARY SMITH | SILVER |
| KEVIN PETERS | BRONZE |

302

| URL FROM COMPANY ABC | SERVICE LEVEL |
|---|---|
| URL1 | GOLD |
| URL2 | SILVER |
| URL3 | BRONZE |

| SERVICE LEVEL (COMPANY XYZ) | SERVERS (min/max) | STORAGE (min/max) | BANDWIDTH (min/max) |
|---|---|---|---|
| GOLD | 20/100 | 20/50 | 30/80 |
| SILVER | 10/50 | 10/30 | 10/50 |
| BRONZE | | | |

402

| SERVICE LEVEL (COMPANY ABC) | SERVERS (min/max) | STORAGE (min/max) | BANDWIDTH (min/max) |
|---|---|---|---|
| GOLD | 30/80 | 20/70 | 20/60 |
| SILVER | 10/40 | 10/20 | 10/50 |
| BRONZE | | | |

SYSTEM AND METHOD FOR PROVIDING DIFFERENTIATED SERVICES ON THE WEB

FIELD OF THE INVENTION

This invention relates in general to the World Wide Web (the Web) and, more specifically, relates to a system and method for providing differentiated services to a subset of customers of a content Web site on the Internet.

BACKGROUND OF THE INVENTION

On the Web a given companies' competitors can be only a few clicks away. As more and more companies establish Web sites to conduct business electronically, competition has become intense in acquiring and retaining valuable customers, as customers can easily go to another Web site from their browsers.

One technique for favoring and rewarding valuable customers that is used in non-Web based enterprises is the use of differentiated services or service levels, wherein a set customers is divided into at least two sub-sets, and where one sub-set is treated in a preferential fashion over the other(s). The differentiation can be based on, as examples, an overall amount of customer purchases, or an amount of customer purchases within some recent interval of time, or on some demographic group that the customer happens to fall into (e.g., age, residence location, marital status, job type, length of employment, etc.). The use of the differentiated services could provide a most-favored customer group with access to special sales events, pre-mailing of some types of promotional materials, preferential seating, additional discounts, the use of platinum, gold and silver credit cards, frequent flyer programs, and various club membership programs.

From a user's perspective, an important aspect of Web usage is response time. However, there is no known content provider or other type of site on the World Wide Web that provides, as an incentive for rewarding and retaining a sub-set of preferred customers, an improved or enhanced response time. Hence, a need exists for providing differentiated services to attract and retain preferred customers the use to the Web to access a content provider.

One system known to the inventors, described in U.S. patent application Ser. No. 09/473,613, filed Dec. 12, 1999, "Method and System for Dispatching Client Sessions within a Cluster of Servers Connected to the World Wide Web," Lamberton et al. disclose a method for load balancing among a cluster of servers. An objective is to achieve load balancing among the servers by dispatching all the requests coming from the same user session to the same server.

Another system known to the inventors is described in U.S. patent application Ser. No. 08/947,361, filed Dec. 23, 1996, "Affinity-Based Router and Routing Method", where D. M. Dias et al. disclose a method for routing packets to a preferred server having affinity with the client.

Another system known to the inventors is described in U.S. patent application Ser. No. 09/544,311, filed Jul. 27, 1999, "System and Method for Allowing Differentiated Service and Load Control in a Clustered Web Site," where D. M. Dias et al. disclose a method for differentiated services and load control. Differentiated services are provided within a clustered web site based on attributes of incoming requests. An aspect of the Dias et al. invention is achieving load control within a single clustered web site by dropping a certain class of requests with specific attributes.

Thus, there is a need to provide a system and method for implementing differentiated services on the Web so that content providers can implement preferred membership programs for their customers. Preferably the differentiated services use a collaboration among many parties, including content providers, ISPs and content hosters.

OBJECTS AND ADVANTAGES OF THE INVENTION

It is a first object and advantage of this invention to provide differentiated services in the form of faster response times to preferred customers of a Web site.

It is a further object and advantage of this invention to implement a membership program that is offered by a content provider and that is carried out collaboratively by ISPs on the network edge and by content hosters on the network core.

It is another object and advantage of this invention to maintain priority tables specific to a content provider based on membership programs, and to combine priority tables at an ISP and/or a content hoster, and to translate the priority tables into a resource allocation table.

SUMMARY OF THE INVENTION

The foregoing and other problems are overcome and the objects and advantages are realized by methods and apparatus in accordance with embodiments of this invention.

A system and method are disclosed for providing differentiated services to a subset of users or customers of a content web site on the Internet. The use of this invention enables a content web site to offer various "club" membership programs to different preferred customers, and enables these customers to enjoy different levels of service experience in accessing the content on the Web. The different levels of service experience are provided by cooperation among multiple clusters of servers on the Internet. The clusters of servers may be owned by various commercial entities, such as Internet service providers (ISPs) on the network edge and the content hosters with server farms on the network core.

This invention provides a technique to attract and retain valuable customers for a content provider Web site by offering differentiated services for customers accessing the site. Such differentiated services can be in the form of, for example, faster response times. In this example, once a customer is identified as a member of a special group, his/her requests receive a higher priority and are serviced accordingly.

This type of differentiated service is especially effective in gaining customer loyalty when traffic is heavy and it is desirable, or even critical, for a customer to have a fast access to Web content. One example is access to a customer's account at an on-line financial site during periods of extreme market volatility.

In light of the current Internet infrastructure, a number of parties may need to collaborate in order to facilitate the implementation of differentiated services by content provider web sites. Individual customers typically access the web site of a content provider, such as www.cnn.com or www.nytimes.com, by connecting their devices, such as a PC, via an ISP (Internet service provider). Hence, an ISP should work with content provider web sites to implement differentiated services in its points of access. Furthermore, more and more content providers are apt to outsource their web sites to a content hoster, which typically sets up one or more data centers equipped with many servers (e.g., a server farm) that are connected to the Internet. Hence, it is preferred that the content hosters on the network core also participate in the deployment of differentiated services.

To implement differentiated services on the Web, in accordance with these teachings, each content provider assigns priorities to its customers. The priority assignment is maintained in a priority table, which may also be referred to as a service level table. Various priority tables from different content providers are then provided to the servers of an ISP and to the servers of a content hoster. Since the ISP or content hoster typically service requests for different content providers, those different content-provider-specific priority tables are preferably merged and translated into a single resource requirement table based on the priorities. Should resources not be sufficient to service certain class(es) of requests, cooperation between different clusters of servers can be arranged.

Providing such differentiated services on the Web enables the creation of business values to many parties. First, the content providers benefit with improved customer retention and acquisition. Once a base of loyal customers are acquired and retained, the content providers may also monetize these customers by charging higher fees for targeted advertisements. Secondly, the users of the differentiated services benefit because they receive better services in the way of improved response times. Thirdly, the content hosters and the Internet service providers may benefit because they may potentially receive credits from the content providers for implementing the differentiated services for their customers.

Depending on the business arrangement and the total resources available on an ISP and the content hoster, the highest priority customers of some content providers may not always be provided the expected level of improved response time or, in an extreme case, may not be serviced at all. Thus, a need is also recognized for considering various options should such conditions occur.

In accordance with a presently preferred embodiment of this invention, differentiated services are provided by a content provider on the Web in the form of faster response times in accessing the content provider's web site. In one embodiment of the present invention, a content provider attracts and retains its valuable customers by offering various club membership programs, such as gold, silver and bronze memberships. Each class of memberships is provided a different level of (average) response time. Although the response time may not be guaranteed, these different levels of response time reflect the different amount of resources allocated to achieve them. For example, regardless of what load condition an ISP is experiencing, a higher priority request is serviced sooner than a lower priority request, thereby providing differentiated services.

Once each content provider implements its own differentiated services, it maintains a priority table indicating the user ID and the user's corresponding priority. These content-provider-specific priority tables are provided to ISPs and to content hosters. An ISP or a content hoster merges the tables into a single ISP-specific or content-hoster-specific resource allocation table for the various priority classes. The merging of one or more priority tables from various content providers can be made dependent on business arrangements made between the content providers and an ISP or content hoster.

BRIEF DESCRIPTION OF THE DRAWINGS

The above set forth and other features of the invention are made more apparent in the ensuing Detailed Description of the Invention when read in conjunction with the attached Drawings, wherein:

FIG. 3 illustrates two exemplary priority tables used by content providers to specify different levels of services for their respective Web content;

FIG. 4 illustrates two exemplary resource requirement tables from two different content providers;

DETAILED DESCRIPTION OF THE INVENTION

Figures 1, 5:
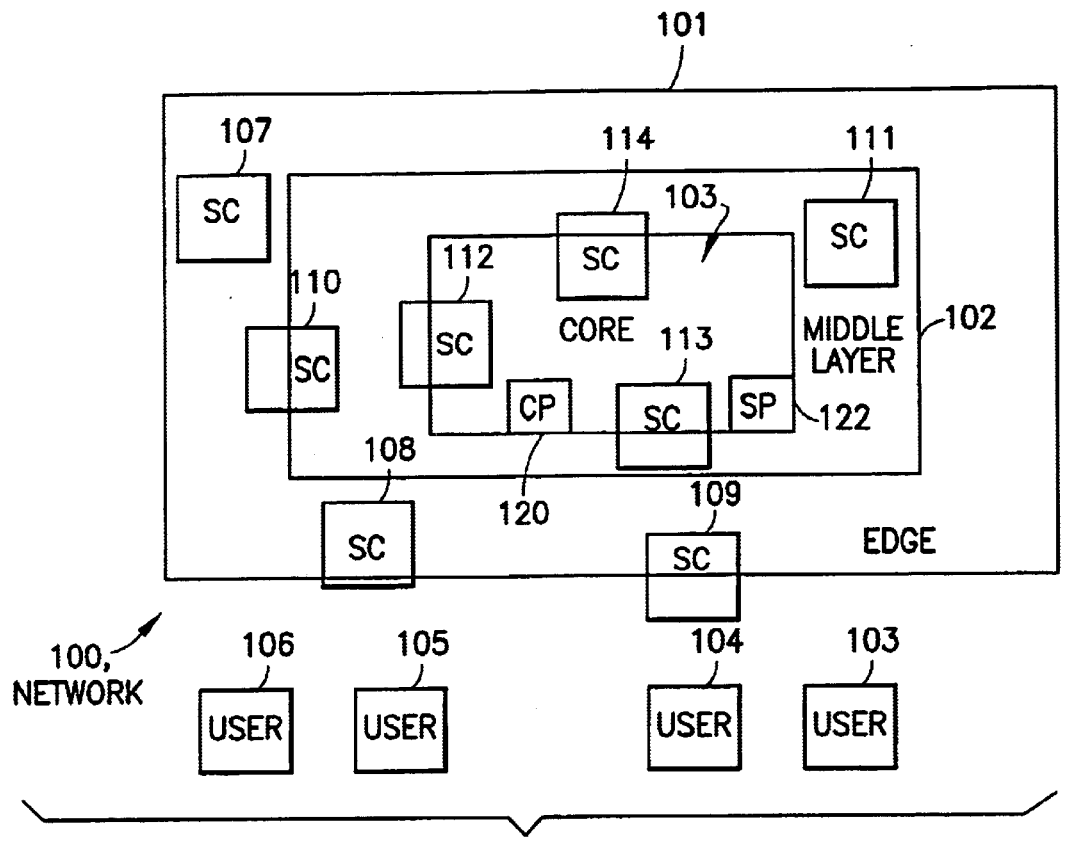
FIG. 1 is a system block diagram showing a multi-clustered Internet content hosting and distribution architecture, and also depicts the relationships among business entities providing different services.
FIG. 5 illustrates a combined resource requirement table from the two resource requirement tables of FIG. 4.

FIG. 1 is a system block diagram showing a multi-clustered Internet content hosting and distribution architecture. It is also a system diagram describing the relationships among a plurality of business entities providing different services. Users (or clients), 103, 104, 105, 106, access a network 100, preferably the Internet, by connecting their devices to a server cluster (SC) 107, 108, 109 on the edge 101 of the network 100. User devices may include, by example, PCs, personal digital assistants, or mobile phones. The server clusters 107, 108, 109 on the edge 101 of the network 100 are typically owned by an ISP or by an ASP (application services provider). Each server cluster has one or more server computers, one or more disks or arrays of disks, and one or more communication links to the Internet and the users 103, 104, 105 and 106. The ISP/ASP provides local Internet connections and local proxy services for content providers. Because the ISP/ASP servers are located on the edge 101 of the Internet, they may be referred to as edge clusters or edge servers.

In contrast, at the core 103 of the network 100, clusters of servers 112, 113, 114 are housed in various data centers by content hosters to provide content hosting services for the content providers. Here, the servers are typically high performance computers, such as the IBM system 390 or SP2. Large arrays of disks are usually employed to store the contents provided by the content providers. High speed routers and load balancing technologies are typically used to handle large numbers of requests. The servers of a content hoster are typically located at the center or core 103 of the Internet, and they are thus typically referred to as the core servers or as core server farms. Between the edge servers 107, 108, 109 and core servers 112, 113, 114, there may be other clusters of servers 110, 111 located in a middle layer 102 of the network 101. These middle layer servers 110, 111 typically provide caching or replication services, and may be owned by the ISP/ASP or the content hoster and used for distributing the Internet contents.

FIG. 1 also shows that the computer systems that provide services on the Web are located physically in different locations in a multi-clustered fashion. Within a server cluster, there are one or more computers, one or more disks and one or more communication switches and routers. They may be owned by various business entities, such as ASPs/ISPs, content hosters, and content providers/application hosters. An individual server cluster may communicate with another server cluster using inter-cluster communication.

Those skilled in the art will appreciate that content providers may choose to host their own contents, and not delegate this responsibility to some other entity, such as a core server farm. In this case, the servers of the content provider are considered to be located in the core 103 of the network 100.

In order to provide differentiated services to the users, in accordance with the teachings herein, these various server clusters of content hosters, content or application providers, and ASPs/ISPs must work together. Therefore, communication mechanisms are generally needed to facilitate information exchanges among the various server clusters.

Figure 2:
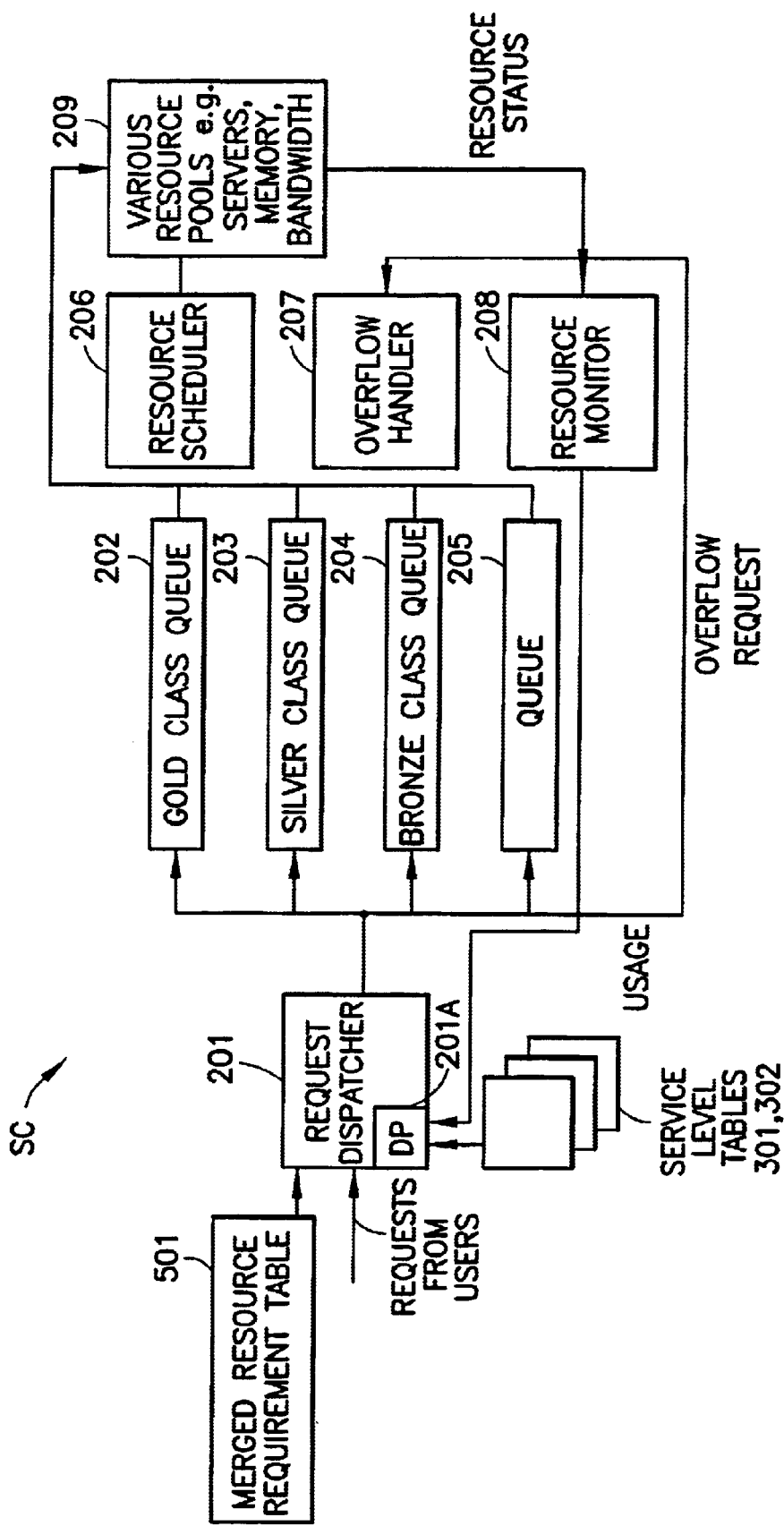
FIG. 2 s a block diagram which showing, within a server cluster, various modules, including a request dispatcher and an overflow handler, that implement the differentiated service of this invention.

FIG. 2 is a block diagram which shows, within a server cluster, the primary modules that implement the differentiated services in accordance with the presently preferred embodiment. The server cluster could be located on the edge 101, in the middle layer 102, or at the core 103 of the network 100. A request dispatcher 201 serves as the front end of a server cluster. It is preferably implemented as a computer system that receives all incoming requests to the cluster. If resources are available, the dispatcher 201 places an incoming request into one of a plurality of service queues 202, 203, 204, 205 based on service levels. Otherwise, it forwards the incoming requests to an overflow handler 207. A resource scheduler 206 assigns requests from the various service queues 202, 203, 204, 205 to various resources in resource pools 209. A resource monitor 208 keeps track of the usage of all the servers in the cluster. This usage information is made available to the request dispatcher 201 for handling incoming requests. Note that the various resource pools 209 may include computer servers, storage capacities and communication bandwidth. More details concerning the operations of the request dispatcher 201 and the overflow handler 207 are provided below with reference to FIG. 6 and FIG. 7, respectively.

FIG. 3 shows two exemplary priority tables 301, 302 used by content providers to specify different levels of services for their Web contents. It should be appreciated that there can be different policies for implementing differentiated services depending on the business model of a content provider. A content provider can differentiate its services based on the user ID. For example, in table 301 user John Doe belongs to the gold service level, Mary Smith belongs to the silver service level and Kevin Peters belongs to the bronze service level. The requests made by these users will be serviced differently. Alternatively, a content provider can choose to implement its differentiated services based on which URLs are being requested, as is shown in table 302. It should also be realized that the priority assignment can be either static or dynamically changing. For example, the priorities could be changed according to how a user accesses the Internet. The service level can be dynamically increased when a user is in the transaction mode and decreased when he/she is in the browsing mode. The user identification can be a request destination, it can be based on a secure protocol such as https, and it may as well be based on HTTP method types, such as get or post.

In any event, the content-provider-specific priority tables 301 and/or 302 are sent to the ISPs/ASPs and content hosters. They are used by the request dispatcher 201 in a server cluster to decide in which service queue 202, 203, 204, 205 to place an incoming request. Note that the queue 205 can be provided to cover the case where an incoming request is from a user who does not have an entry in the tables 301, 302 (e.g., a new user).

The priority tables 301,302 are preferably converted into corresponding resource requirement tables 401,402 in a server cluster. FIG. 4 shows two exemplary resource requirement tables from two different content providers (company xyz and company abc). In tables 401 and 402 the minimum and maximum resource requirements are specified for various service levels (e.g., gold, silver, bronze). These resource requirement tables 401, 402 capture the contracts bounded by the service level agreements (SLA) between the content providers and ISPs/ASPs or between the content providers and the content hosters. For example, in table 401 in order to provide the gold service level to requests coming from company xyz, a minimum of 20 servers, 20 storage units and 30 bandwidth units must be made available. The maximum resource requirements indicate the limited amount of resources that can be used to service the various requests coming from company xyz. Once these limits are reached additional requests can either be forwarded to another server cluster or simply dropped.

In the preferred embodiment there is a unique resource requirement table 401, 402 for each content provider. These content provider-specific resource requirement tables 401, 402 are preferably merged or combined into a single ISP-specific or content hoster-specific table at each server cluster. This merging operation can be performed by the request dispatcher 201 of FIG. 2.

FIG. 5 shows a combined resource requirement table 501 that is derived from the two resource requirement tables 401, 402 from FIG. 4. In the combined resource requirement table 501 the combined minimum resource requirement is the sum of all the minimum resource requirements from all individual resource requirement tables 401, 402. For example, the combined minimum number of servers to provide gold level service for users of both company xyz and company abc is 50 (which is the sum of the minimum server requirements in tables 401 and 402). The combined maximum resource requirement is a number that is preferably, but not necessarily, larger than the largest of all the maximum requirements from all of the individual tables 401, 402.

It may be desirable for each ASP/ISP, or content hoster, to determine the combined maximum amount of resources for implementing each service level. This determination may be based on the assumption that not all maximum resources will be used at the same time. For example, the combined maximum requirements for the gold server level are 130 servers, 80 storage units and 100 bandwidth units.

Those skilled in the art will appreciate that there may be other requirements that must be met in order to fulfill the contracts specified in the service level agreements. For example, availability, replacement or upgrade warranty, emergency notification, and so on, may also need to be provided.

Figure 6:
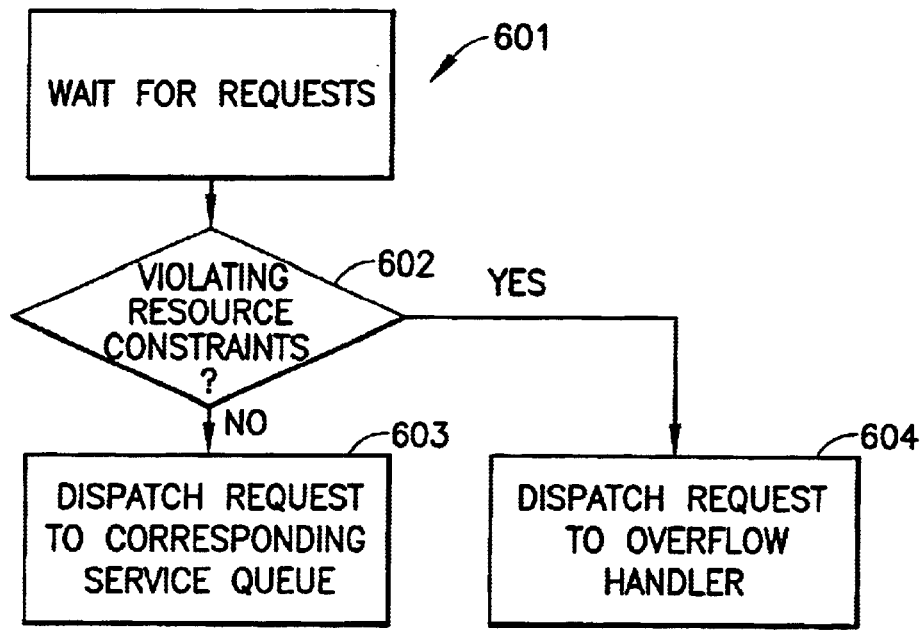
FIG. 6 is a flow chart diagram showing the operation of the request dispatcher of FIG. 2.

FIG. 6 is a flow chart diagram showing the operations of the request dispatcher 201 of FIG. 2. In Step 601 the dispatcher 201 waits for incoming requests. For any incoming request, at Step 602 the dispatcher 201 first checks to determine if any resource constraint specified in the combined resource requirement table 501 will be violated by attempting to fulfill the request. Note that, in checking resource constraint violations at Step 602, the request dispatcher 201 uses the resource usage information provided by the resource monitor 208. If resource constraints are not violated control passes to Step 603 where the incoming request is dispatched to the corresponding service queue 202, 203, 204, or 205 based on the content-provider-specific priority table 301, 302 (see FIG. 3). Otherwise, at Step 604 the incoming request is dispatched to the overflow handler 207, along with an indication of what resource(s) would be violated if the incoming request was fulfilled.

Figure 7:
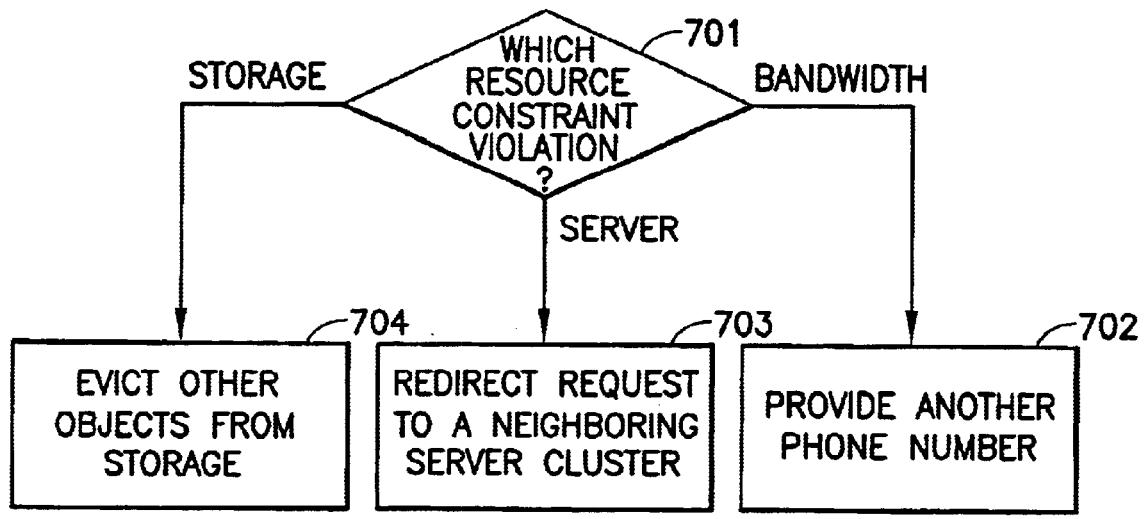
FIG. 7 is a flow chart diagram of an exemplary implementation of the overflow handler of FIG. 2.

FIG. 7 is a flow chart diagram depicting an implementation of the overflow handler 207. Of FIG. 2 Depending on which resource constraint is violated, as determined in Step 701, different actions may be taken. For example, if the constraint being violated is storage, control passes to Step 704 where other objects may be evicted from the storage, making room for the incoming request. If instead the server is overloaded, at Step 703 the request may be redirected to a "friendly" neighbor server cluster using inter-cluster communication, or it may be dispatched to the content hoster. If the constraint being violated is bandwidth, then at Step 702 the user may be given an alternate telephone number (content provider access number) to re-dial. For the case where there are other constraints that are considered, then additional steps and flow paths are provided as required.

Those skilled in the art will appreciate that there are other possible implementations of these teachings. For example, before any action is taken by the overflow handler 207, a dialogue may be initiated between the parties involved in order to facilitate negotiation. If no acceptable action can be taken to service the request, the request may be discarded. Moreover, for lower priority requests, the requests may simply be dropped without cooperation from another server cluster, and special actions may be taken only for higher priority requests. The special action may include, by example, requesting other users to give up their currently allocated services and to receive some type of "credit" in return for doing so. This is especially useful during those times when resources are highly utilized in a server cluster and other clusters are not available to take the overflow.

Those skilled in the art will appreciate that resource requirements for various service levels can be periodically adjusted based on resource usage information collected during operation. For example, if the resources for a high priority service level is constantly running low in given a server cluster, then it is desirable for the ASP/ISP, or the content hoster, to add additional resources. If resources cannot be added on site, then help from other server clusters can be arranged. By the same token, if the resource requirements are overestimated, the underutilized resources could be used to aid other, more heavily loaded server clusters.

Those skilled in the art will also appreciate that providing differentiated services on the Web can create business values to the content providers other than acquiring and retaining customers. Once loyal customers are acquired and retained, the content providers may also monetize these customers by charging higher fees for targeted advertisements for customers with a specific service level.

It should further be appreciated that the teachings of this invention provide in one aspect a data communications network 100 that includes network servers which may be organized into clusters of network servers 107, 108, 109, 110, 111, 112, 113, 114, as well as content providers 120 and service providers 122, such as ISPs and ASPs, and includes at least one data processor, such as a data processor (DP) 201A shown in FIG. 2, that operates under control of a stored program resident on a memory media. The memory media could be a disk, a tape, semiconductor memory, etc. The stored program directs operation of the data processor to provide users with differentiated services by defining, for individual ones of the plurality of content providers, a plurality of levels of services for users, and for responding to service level tables 301, 302 received from individual ones of the plurality of content providers, where individual ones of users are assigned to one of the plurality of levels of service. There is also at least one resource requirement table 401, 402 for defining at least a minimum set of resources required for realizing individual ones of said plurality of service levels. The program further directs operation of the at least one data processor to merge the plurality of resource requirement tables into a merged resource requirement table 501 for use by a particular one of the network servers or cluster of servers. The particular one of the network servers assigns differentiated service levels to incoming user requests in accordance with the service level tables, and in accordance with the merged resource requirement tables and currently available resources. The resources can include one or more of numbers of available servers, available memory capacity, and available bandwidth. The program further controls operation of the at least one data processor to redirect an incoming user request to a network server having sufficient available resources to provide a specified level of service for the user request.

Figure 8:
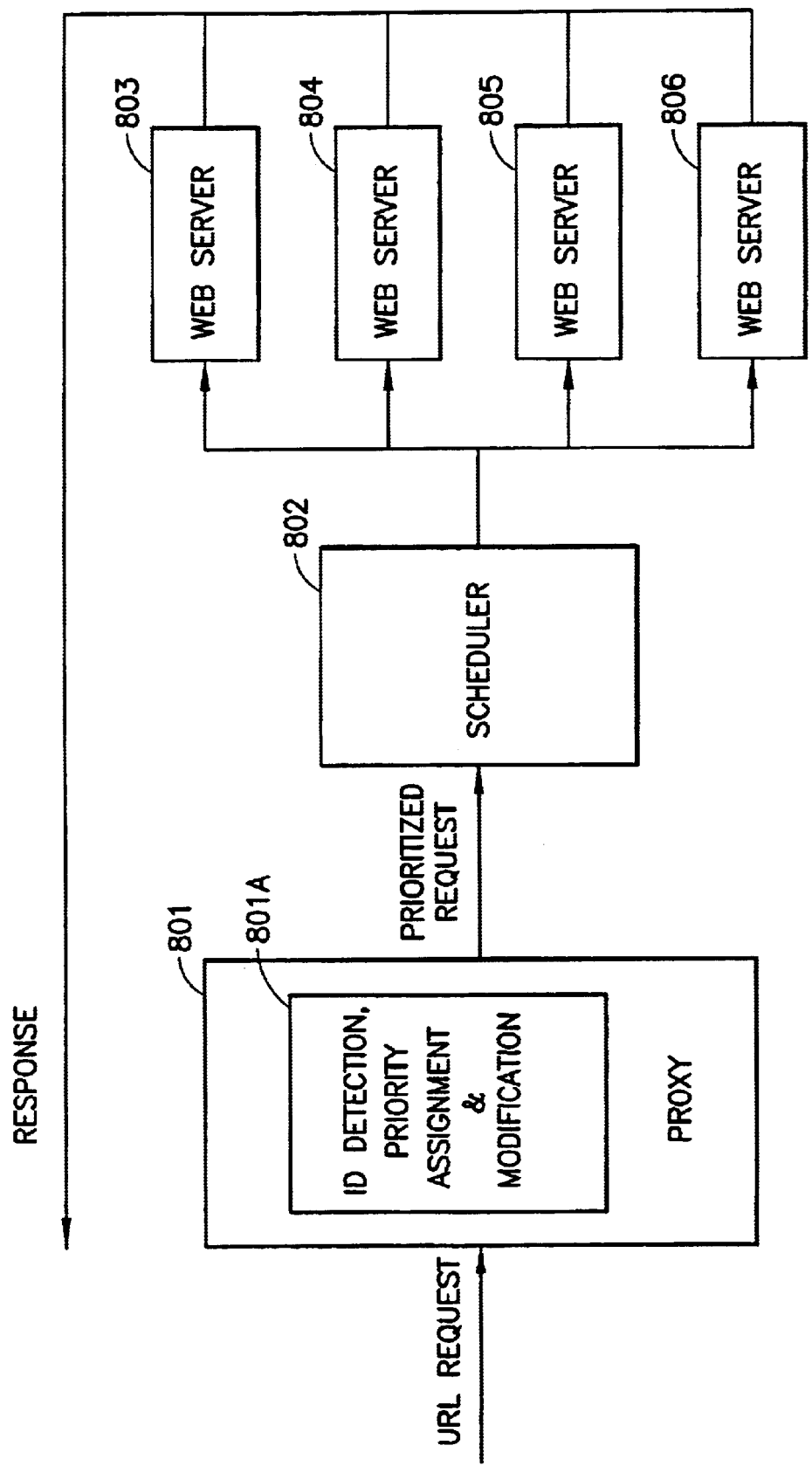
FIG. 8 is a block diagram depicting the operation of this invention.

FIG. 8 shows the foregoing teachings in the context of the use of a proxy server 801 that receives URL requests and that includes a logic block 801A that provides ID detection and extraction, priority assignment and modification. The proxy server 801 outputs a prioritized request to a scheduler 802 that routes the request to one of a plurality of servers 803–806. The selected server 803–806 subsequently provides the desired response. The ID can be based on, by example, a cookie, a login ID, or client machine information. The assigned priority is preferably based on the priority table 301, 302 supplied by the content provider 120 (FIG. 1), and the priority may be modified based on operational data or criteria. The requests are scheduled based on the assigned (or modified) priorities.

Although described in the context of three levels of service, certain resource requirements, certain specific types of resources and the like, it should be appreciated that these are exemplary, and are not to be read in a limiting sense upon the practice of the teachings of this invention. Thus, while the invention has been particularly shown and described with respect to preferred embodiments thereof, it will be understood by those skilled in the art that changes in form and details may be made therein without departing from the scope and spirit of the invention.

What is claimed is:

1. In a data communications network, a method for providing differentiated services with at least one network server, comprising the steps of:

providing a plurality of content providers each offering users a plurality of levels of services;

creating with individual ones of said plurality of content providers at least one service level table and at least one resource requirement table;

merging said resource requirement tables of said plurality of content providers into a merged resource requirement table; and at said at least one network server, assigning differentiated service levels to incoming user requests in accordance with said service level tables and in accordance with said merged resource requirement table.

2. A method as in claim 1, wherein said at least one network server forms a part of a server cluster.

3. A method as in claim 2, wherein there are a plurality of said server clusters coupled to said data communications network.

4. A method as in claim 3, wherein said network server collaborates in serving user requests with at least one other network server through inter-cluster communication.

5. A method as in claim 1, further comprising a step of providing a network edge server communicating with another network edge server to redirect requests.

6. A method as in claim 1, further comprising a step of providing a network edge server communicating with a network core server to redirect requests.

7. A method as in claim 1, further comprising a step of providing a network edge server communicating to Internet users for enabling Internet users to yield current services in exchange for credit.

8. A method as in claim 1, wherein said service level table comprises an identification of a user and a corresponding user service level.

9. A method as in claim 1, wherein said service level table comprises a URL and a corresponding URL service level.

10. A method as in claim 1, wherein said step of merging said plurality of resource requirement tables merges tables from a plurality of different content providers based on preexisting business relationships between a network service provider or content hoster and said content providers.

11. A method as in claim 1, wherein said step of assigning differentiated service levels comprises steps of:
    extracting a user identification from an incoming request; and
    assigning one of a plurality of differentiated service level to said incoming request based at least in part on said user identification.

12. A method as in claim 11, wherein said user identification comprises a request destination.

13. A method as in claim 11, wherein said user identification is based on a secure protocol.

14. A method as in claim 11, wherein said user identification is based on a HTTP method type.

15. A method of claim 1, wherein said differentiated service level is variable, and is made a function of at least operational criteria.

16. A method as in claim 1, wherein said differentiated services are employed for targeted advertisement purposes by identifying a service level of a user request and dynamically placing at least one targeted advertisement on content for said user.

17. A data communications network comprising network servers, content providers, and service providers, said network operating so as to provide users with differentiated services by defining, for individual ones of said plurality of content providers, a plurality of levels of services for users, for creating with individual ones of said plurality of content providers at least one service level table, wherein individual ones of users are assigned to one of said plurality of levels of service, and at least one resource requirement table for defining at least a minimum set of resources required for realizing individual ones of said plurality of service levels, said network operating to merge said resource requirement tables of said plurality of content providers into a merged resource requirement table for use by a particular one of said network servers, and wherein said particular one of said network servers assigns differentiated service levels to incoming user requests in accordance with said service level tables, and in accordance with said merged resource requirement table and currently available resources.

18. A network as in claim 17, wherein a plurality of network servers are grouped into server clusters.

19. A network as in claim 18, wherein there are server clusters at a core of said network, and server clusters at an edge of said network.

20. A network as in claim 18, wherein said network server collaborates in serving user requests with at least one other network server through inter-cluster communication.

21. A network as in claim 19, wherein said server clusters at the edge of the network communicate with users and with one another to redirect requests.

22. A network as in claim 19, wherein a server cluster at the edge of the network communicates with a server cluster at the core of the network to redirect requests.

23. A network as in claim 19, wherein said server clusters at the edge of the network communicate with users for enabling users to yield current services in exchange for credit.

24. A network as in claim 17, wherein said service level table comprises a URL and a corresponding URL service level.

25. A network in claim 17, wherein said network merges said plurality of resource requirement tables from a plurality of different content providers based on preexisting business relationships between a network service provider or content hoster and said content providers.

26. A network as in claim 17, wherein said network server comprises a request dispatcher for extracting a user identification from an incoming request and assigning one of a plurality of differentiated service levels to said incoming request based at least in part on said user identification.

27. A network as in claim 26, wherein said user identification comprises a request destination.

28. A network as in claim 26, wherein said user identification is based on a secure protocol.

29. A network as in claim 26, wherein said user identification is based on a HTTP method type.

30. A network as in claim 17, wherein said differentiated service level is variable, and is made a function of at least operational criteria.

31. A network as in claim 17, wherein said differentiated services are employed for targeted advertisement purposes by identifying a service level of a user request and dynamically placing at least one targeted advertisement on content for said user.

32. In a data communications network comprising network servers, content providers, and service providers, at least one data processor operating under control of a stored program resident on a memory media, said stored program directing operation of said data processor to provide users with differentiated services by defining, for individual ones of said plurality of content providers, a plurality of levels of services for users, for creating with individual ones of said plurality of content providers at least one service level table, wherein individual ones of users are assigned to one of said plurality of levels of service, and at least one resource requirement table for defining at least a minimum set of resources required for realizing individual ones of said plurality of service levels, said program further directing operation of said at least one data processor to merge said plurality of resource requirement tables into a merged resource requirement table for use by a particular one of said network servers, and wherein said particular one of said network servers assigns differentiated service levels to incoming user requests in accordance with said service level tables, and in accordance with said merged resource requirement table and currently available resources.

33. A program as in claim 32, wherein said resources comprise at least one of numbers of available servers, available memory capacity, and available bandwidth.

34. A program as in claim 32, wherein said program further controls operation of said at least one data processor to redirect an incoming user request to a network server having sufficient available resources to provide a specified level of service for a user request.

* * * * *